US012544766B2

(12) United States Patent
Böckle et al.

(10) Patent No.: US 12,544,766 B2
(45) Date of Patent: Feb. 10, 2026

(54) ROCK PROCESSING APPARATUS WITH IMPROVED PLANNING OF THE LOCATION OF A MATERIAL FEED WITHIN A MATERIAL BUFFER

(71) Applicant: Kleemann GmbH, Göppingen (DE)

(72) Inventors: Tobias Böckle, Weinstadt (DE); Thomas Kühnle, Kirchheim / Teck (DE)

(73) Assignee: Kleemann GmbH, Göppingen (DE)

( * ) Notice: Subject to any disclaimer, the term of this patent is extended or adjusted under 35 U.S.C. 154(b) by 477 days.

(21) Appl. No.: 18/353,344

(22) Filed: Jul. 17, 2023

(65) Prior Publication Data

US 2024/0024888 A1    Jan. 25, 2024

(30) Foreign Application Priority Data

Jul. 19, 2022   (DE) ..................... 10 2022 118 036.0

(51) Int. Cl.
*B02C 25/00* (2006.01)
*B02C 23/10* (2006.01)

(52) U.S. Cl.
CPC .............. *B02C 23/10* (2013.01); *B02C 25/00* (2013.01)

(58) Field of Classification Search
CPC ...................................................... B02C 25/00
See application file for complete search history.

(56) References Cited

U.S. PATENT DOCUMENTS

| 4,281,800 | A  | 8/1981 | Flavel |
| 4,909,449 | A  | 3/1990 | Etheridge |
| 8,768,579 | B2 | 7/2014 | Taylor et al. |

(Continued)

FOREIGN PATENT DOCUMENTS

| CN | 102076417 A | 5/2011 |
| CN | 105855269 A | 8/2016 |

(Continued)

OTHER PUBLICATIONS

Extended Search Report for corresponding patent application No. 23185115.5, dated Jan. 2, 2024, 5 pages.

(Continued)

*Primary Examiner* — Suresh Suryawanshi
(74) *Attorney, Agent, or Firm* — Gary L. Montle; Lucian Wayne Beavers; Patterson Intellectual Property Law, PC (57) ABSTRACT

The present disclosure relates to a rock processing apparatus for crushing and/or sorting granular mineral material according to size, comprising: a material feeding apparatus including a material buffer, the material feeding apparatus having an overall feed area, at least one working unit of at least one crushing apparatus and at least one screening apparatus, at least one conveyor apparatus, a control unit, at least one sensor for detecting at least one operating parameter, the sensor being connected to the control unit, at least one output device for outputting information. The control unit is designed, in an operation with discontinuous material feed of starting material to be processed, to ascertain a local target subarea within the overall feed area, selected for the next material feed, on the basis of the at least one detection signal as location information, and to transmit the location information to the output device.

18 Claims, 4 Drawing Sheets

(56) References Cited

U.S. PATENT DOCUMENTS

| | | |
|---|---|---|
| 8,770,501 B2 | 7/2014 | Laukka et al. |
| 11,325,132 B2 | 5/2022 | Schmid et al. |
| 11,383,246 B2 | 7/2022 | Eckert et al. |
| 11,925,939 B2 | 3/2024 | Meier et al. |
| 2019/0284784 A1* | 9/2019 | Darlington ............... H04Q 9/00 |
| 2020/0132882 A1 | 4/2020 | Runkana et al. |
| 2021/0154706 A1 | 5/2021 | Dirscherl et al. |
| 2021/0325899 A1 | 10/2021 | Grambihler et al. |
| 2022/0097076 A1* | 3/2022 | Meier ................... B02C 13/095 |

FOREIGN PATENT DOCUMENTS

| | | | | |
|---|---|---|---|---|
| CN | 106906866 A | | 6/2017 | |
| CN | 107737638 A | * | 2/2018 | ............. B02C 13/31 |
| CN | 111201087 A | | 5/2020 | |
| CN | 211026657 U | * | 7/2020 | |
| CN | 111788004 A | | 10/2020 | |
| CN | 112295710 A | * | 2/2021 | ............. B02C 23/02 |
| CN | 112317103 A | | 2/2021 | |
| CN | 112604939 A | * | 4/2021 | ............. B02C 23/16 |
| CN | 113385256 A | | 9/2021 | |
| CN | 114247536 A | | 3/2022 | |
| DE | 102017124958 A1 | | 4/2019 | |
| DE | 102020003966 A1 | | 1/2022 | |
| EP | 3714981 A1 | * | 9/2020 | ............. B02C 21/02 |
| WO | 2020007846 A1 | | 1/2020 | |

OTHER PUBLICATIONS

China Office Action for corresponding patent application No. CN 2025072401726820, dated Jul. 24, 2025, 8 pages.
Corresponding co-pending U.S. Appl. No. 18/353,332.
Corresponding co-pending U.S. Appl. No. 18/353,357.
Corresponding co-pending U.S. Appl. No. 18/353,367.

* cited by examiner

ROCK PROCESSING APPARATUS WITH IMPROVED PLANNING OF THE LOCATION OF A MATERIAL FEED WITHIN A MATERIAL BUFFER

CROSS-REFERENCES TO RELATED APPLICATIONS

This application claims benefit of German Patent Application No. 10 2022 118 036.0, filed Jul. 19, 2022, and which is hereby incorporated by reference.

BACKGROUND

The invention relates to a rock processing apparatus for crushing and/or sorting granular mineral material according to size.

A rock processing apparatus of this kind is known from U.S. Pat. No. 8,768,579 B2. This printed document teaches to position the bucket of a backhoe loading the rock processing apparatus, with the assistance of the control unit of the backhoe, over the material feeding apparatus in such a way that material falling out of the bucket actually lands in the material feeding apparatus without missing it, that a door of the bucket releasing the material in the bucket for delivery, when swinging open from the closed state, does not collide with the material feeding apparatus or the material buffer, and that material is not released from an excessive height, so that it does not damage the material feeding apparatus when striking it.

In order to achieve these objectives by a corresponding correct positioning of the bucket prior to the material feed, a control unit of the backhoe can receive positional data of the material feeding apparatus and calculate from these an optimized final position of the bucket for the material feed as well as a movement path to the final position. Alternatively, the machine operator of the backhoe can "teach" the backhoe. As a further alternative, an automated alignment system may be provided, which with the aid of sensors, such as GPS sensors, optical cameras or 3-D laser scanners, performs an automatic alignment of the bucket and the material feeding apparatus until the bucket is both sufficiently precisely positioned above the material feeding apparatus, so that no material is discharged next to the material feeding apparatus, and is positioned at a suitable height in order to avoid on the one hand the collision of said door with the rock processing apparatus and to avoid on the other hand damage to the material feeding apparatus by an excessive height of fall of the released material.

The rock processing apparatus known from US. Pat. No. 768,579 B2 and the backhoe loading it are able to exchange data with each other via a communication device. Thus, for example, the rock processing apparatus is able to transmit production data or GPS positional data of its material feeding apparatus to the control unit of the backhoe.

A complete release of material from a loading apparatus, such as the aforementioned backhoe, into the material buffer of the rock processing apparatus, requires a correct positioning of the loading tool, such as the aforementioned bucket, above the overall feed area of the material feeding apparatus. In the present application, the overall feed area of the material feeding apparatus is defined as the area of the material feeding apparatus for which it is the case that a solid body falling freely above the overall feed area along the direction of the force of gravity lands in the material feeding apparatus and remains in it. Generally, the feed opening of the material buffer of the material feeding apparatus may be regarded as the overall feed area. Even if material is released from the material buffer over a larger area than the opening area of the feed opening to a feed conveyor apparatus, which conveys material from the material buffer to a working unit, the often funnel-shaped material buffer is passively able to feed material discharged anywhere within the feed opening to the feed conveyor apparatus.

The charging or loading of a rock processing apparatus substantially influences the economic efficiency of the rock processing apparatus. In this respect, the collision-free and, if possible, lossless material feed, as taught in U.S. Pat. No. 8,768,579 B2, is only one of what are actually several influence variables. The manner of loading a material buffer, not only as a process of loading, but as a state of being loaded, determines the further flow of material starting from the material buffer into the rest of the rock processing apparatus.

SUMMARY

It is therefore an object of the present disclosure to improve the rock processing apparatus mentioned at the outset with respect to the flows of material in the rock processing apparatus emanating from the material buffer.

A rock processing apparatus according to the present disclosure achieves this object in that the control unit is designed, in an operation with discontinuous material feed of starting material to be processed, to ascertain a local target subarea within the overall feed area, selected for the next material feed, on the basis of the at least one detection signal as location information, and to transmit the location information to the output device, the output device being designed to output the location information.

Using the output location information, a receiver of the location information is not only able to feed material into the material buffer without loss but is able to feed material at a preferred location or in a preferred area within the material buffer.

Preferably, the portion of the target subarea in the overall feed area is no more than two thirds of the latter, the target subarea being located entirely within the overall feed area. Particularly preferably, the portion of the target subarea in the overall feed area is no more than 55%. Generally, the target subarea is to be understood as a subarea of the overall opening area of the feed opening of the material buffer.

Thus, for example, it is possible spatially to even out and thus homogenize a material buffer loaded for whatever reason in an asymmetrical manner. In the same way, by considering a working unit situated downstream of the material buffer in the flow of material, in particular a screening apparatus, it is possible to improve the effectiveness of the latter by a targeted local material feed within the overall feed area, be it because the material from the material buffer can be guided advantageously across a screening line and/or because the material from the material buffer may advantageously enter a crushing apparatus.

In the operation with discontinuous material feed, the rock processing apparatus is preferably designed to ascertain respectively an individual target subarea within the overall feed area as pieces of consecutive location information for at least two, particularly preferably for more than two consecutive future material feeds and to output these respectively via the output device. Thus, the target subareas as feed locations of a series of consecutive material feeds within the overall feed area may be suitably ascertained and output as location information as a function of the at least one operating parameter represented by the at least one detection signal, that is, ascertained and output individually for the operating situation of the rock processing apparatus as it develops further due to the preceding material feed.

The rock processing apparatus may comprise only one or multiple screening apparatuses as the at least one working unit. The rock processing apparatus is then a pure screening system. In the same way, the rock processing apparatus may comprise only one or multiple crushing apparatuses as the at least one working unit. The rock processing apparatus is then a pure crushing system. In the preferred configuration, the rock processing apparatus comprises both at least one screening apparatus as well as at least one crushing apparatus. The screening apparatus may be a pre-screen situated upstream of the crushing apparatus in the flow of material, possibly having multiple screen decks, and/or it may be a post-screen situated downstream from the crushing apparatus in the flow of material in order to sort the output provided by the crushing apparatus according to grain sizes. The post-screen may also comprise at least one screen deck or multiple screen decks.

The crushing apparatus may be any known crushing apparatus, for example an impact crusher or a jaw crusher or a cone crusher or a roll crusher. If the rock processing apparatus has more than one crushing apparatus, these crushing apparatuses may be crushing apparatuses of the same kind or of different kinds. Each individual crushing apparatus may be one of the aforementioned crusher types: impact crusher, jaw crusher, cone crusher and roll crusher.

Although it is in principle possible that the control unit ascertains the location information exclusively from detection signals of the at least one sensor, it is not to be ruled out that the control unit also takes into consideration information input by a machine operator or another person when ascertaining the location information. For this purpose, a preferred development of the present disclosure may provide for the rock processing apparatus to comprise an input device for inputting information, the input device being connected in signal-transmitting fashion to the control unit for transmitting information. The control unit is preferably designed to ascertain, in operation with discontinuous material feed, the location information on the basis of the at least one detection signal and a piece of information input into the input device.

The input device may be any input device, such as a keyboard, a touchscreen and the like. The input device may also be connected to the control unit in signal-transmitting fashion via a cable link or a radio link, so that it is not necessary for it to be physically present on the rock processing apparatus. A signal-transmitting connection of the input device and/or of the at least one sensor to the control unit may also be a connection by interposition of a data memory, in which pieces of information input into the input device and/or pieces of information output by the at least one sensor for detecting the at least one operating parameter are stored as data and are retrieved as stored data by the control unit. The control unit therefore preferably comprises a data memory, which is connected to the control unit in signal-transmitting fashion. In this data memory, the control unit is able to store data provided by the input device and/or by the at least one sensor and is able to retrieve them again as stored data. The input device and/or the at least one sensor may also be connected directly to the data memory in signal-transmitting fashion, so that the input device is able to transmit information input into it as directly into the data memory for storage as the at least one sensor is able to transmit results of its detection operation.

Data, which do not change over the operational life of the rock processing device or which can be changed only with great effort, for example via the machine configuration of the rock processing apparatus and its components, may be stored permanently in the data memory and may be stored for example by the manufacturer of the rock processing apparatus during the manufacture of the same or prior to its delivery. Nevertheless, if the machine configuration should change, for example in the course of maintenance or repair, the service provider performing the maintenance or repair work is able to make appropriate changes to the content of the data memory.

The data memory may be connected wirelessly to the control unit in signal-transmitting fashion, for example by a radio link or by the transmission of optical signals. In principle, the data memory may therefore be provided separately and at a distance from the rest of the rock processing apparatus. The "rest of the rock processing apparatus" is here represented by its machine body. The machine body comprises the machine frame and all components of the rock processing apparatus connected to the machine frame, even when these are connected so as to be movable relative to the machine frame.

Preferably, the at least one sensor for ascertaining a spatial depletion behavior of the material buffer during a normal operation of the rock processing apparatus is designed to detect and transmit to the control unit at least one of the following operating parameters: a fill ratio of the material buffer; in each case one local area fill ratio of at least two different areas of the material buffer; fill ratio of at least one conveyor apparatus; fill ratio of at least one working unit; grain shape and/or grain size and/or grain size distribution of fed and/or conveyed material; type of fed and/or conveyed material; humidity of the fed material; density of the fed material; hardness of the fed material; crushability of the fed material; abrasiveness of the fed material; state of the fed material; quantity of returned oversize grain; size of a loading tool of a loading apparatus discontinuously loading the material buffer; feed quantity of material to be fed; conveying speed of at least one conveyor apparatus; working speed of at least one working unit; quantity of material already processed by the rock processing apparatus, but returned into the material buffer; quantity of, in particular non-crushable, foreign material; at least one fill ratio of a further material buffer of the rock processing apparatus and/or of a further rock processing apparatus of the same rock processing system.

In principle, one sensor suffices for detecting an operating parameter. In this context, however, already one and the same operating parameter may be detected by multiple sensors, for example if the fill ratio of the material buffer to be ascertained is not an average fill ratio, but rather a location-dependent local fill ratio. If more than one operating parameter are to be detected, the rock processing apparatus may have more than one sensor. The same applies, if more than one physical operating principle is to be used for detecting one or multiple operating parameters.

The at least one operating parameter may be detected qualitatively and/or quantitatively. If more than one operating parameter is detected, then a portion of the operating parameters may be detected qualitatively and another portion may be detected quantitatively. Furthermore, it is also conceivable that at least one operating parameter is detected both quantitatively as well as qualitatively.

The fill ratio of the material buffer may be detected for example by one or multiple ultrasonic sensors. Additionally or alternatively, an optical detection by at least one camera as sensor and/or a tactile detection by a mechanical sensor is possible. The fill ratio of the material buffer, which is usually funnel-shaped, is a measure for the supply of material still to be processed in the rock processing apparatus.

The fill ratio of the material buffer may be represented by a fill level of the material fed into the material buffer. For this purpose, a single value of the fill level may be used as a representative value for an entire average fill level of the material buffer. Preferably, several local fill levels are ascertained in order to determine in each case one local area fill ratio of at least two different areas of the material buffer in order thus to increase the local resolution of the loading or filling of the material buffer. This makes it possible to detect a spatially uneven load and to ascertain from the uneven load target subareas for a future material feed with the aim of evening out the load of the material buffer. Thus, it is possible, for example, to select a subarea in the overall feed area with the lowest local area fill ratio, relative to other subareas of the overall feed area, as the target subarea for a next material feed.

It is also conceivable, using optical methods such as laser scanning, to ascertain a profile of the surface of material fed into the material buffer and its height above the known bottom of the material buffer. The fill level or the local fill levels up to the surface profile of the infed material may already sufficiently represent the fill ratio. They may alternatively be set in relation to the maximum holding capacity of the material buffer.

In this context, an overfilled material buffer, in particular a feed hopper, is to be avoided as much as an underfilled material buffer. In the case of an overfilled material buffer, material is lost in the feeding process, because it can slide off a material heap in the material buffer and fall alongside the material feeding apparatus. Furthermore, the conveying capacity of the material buffer may deteriorate and the screening capacity of a pre-screen situated downstream from the material buffer may be influenced negatively when overloading the material buffer. Moreover, overfilling the material buffer may result in a pileup in a working unit, in particular in a crushing apparatus, downstream in the flow of material. An underfilled feed hopper may result in high stress on the conveyor apparatus connected to the material buffer, since material then strikes the conveyor apparatus directly during the feeding of material, which may cause increased wear and a higher noise emission.

The fill ratio of the material buffer and its temporal and spatial development is a particularly preferred operating parameter for ascertaining a next target subarea of a future material feed. If it is possible to ascertain, for example, where, and possibly also when, a local area fill ratio of the material buffer reaches a predetermined minimum fill ratio, then it is possible to derive from this information where within an overall feed area available for a material feed, and possibly also when, the material buffer should be loaded in order to avoid a disadvantageous load state.

Preferably, the fill ratio or the local area fill ratios of the material buffer is or are detected repeatedly in order to ascertain a depletion behavior of the material buffer. The rock processing apparatus preferably comprises a time measuring device, which is connected in signal-transmitting fashion to the control unit, possibly by interposition of the aforementioned data memory. The or a time measuring device may be integrated in the at least one sensor and/or in the input device and/or in the control unit. Via signals of the time measuring device, the control unit is able to assign an event time to detection events of the at least one sensor and/or input events of the at least one input device. From the time interval of at least two event times for an event of the same kind, for example the detection of one and the same operating parameter, the control unit is able to determine a rate of change associated with the respective events. Thus, the control unit is able to ascertain local rates of change of the fill ratio or rates of change of the local area fill ratios from two detections of local area fill ratios of the material buffer and the known time interval between these detection events. From the ascertained rates of change and a fill ratio known by detection, the control unit is able so select, for example by extrapolation, a target subarea as the area within the overall feed area, which starting from its current local area fill ratio will reach as the first subarea a predetermined minimum fill level.

As an alternative or preferably in addition to the fill ratio of the material buffer, the fill ratio of at least one conveyor apparatus may be detected as the or a relevant operating parameter. Preferred in this context is the detection of the fill ratio of a conveyor apparatus conveying material from the material buffer to a working unit, in particular to a crushing apparatus. For the conveying capacity of a conveyor apparatus conveying material directly from the material buffer influences both the fill ratio of the material buffer as well as the fill ratio of the working unit, in particular the crushing apparatus, to which it conveys material. The equivalent applies for detecting a conveying speed of at least one conveyor apparatus, which preferably is again the conveyor apparatus conveying material between the material buffer and the working unit, in particular the crushing apparatus.

The product of fill ratio and conveying speed of a conveyor apparatus provides a measure for the volume conveyed by the conveyor apparatus or for the conveying capacity of the conveyor apparatus.

The conveyor apparatus may be a belt conveyor apparatus or a trough conveyor apparatus, the latter conveying preferably according to the micro throw principle as a vibrating conveyor. A vibrating conveyor, preferably in the form of a trough conveyor apparatus, is preferred especially as a conveyor apparatus for conveying material between the material buffer and a crushing apparatus. The rock processing apparatus may also comprise a plurality of conveyor apparatuses and will normally comprise such a plurality, for example because one and the same conveyor apparatus is not able to convey material as a feed conveyor apparatus from the material buffer to a working unit and as a discharge conveyor apparatus away from a working unit and out of the rock processing apparatus. In the case of a plurality of conveyor apparatuses, these may use different conveying principles, such as the micro throw principle in vibrating conveyors already described above and/or such as a belt conveyor, the belt conveyor being normally used primarily as a discharge conveyor apparatus due to the smaller grain size occurring in the discharge and a usually more homogeneous grain size distribution.

A conveying speed of a conveyor apparatus may be ascertained in various ways. The conveying speed may be determined independently of the type of conveyor apparatus by detecting a motion in the conveying direction of a material lying on the conveyor apparatus, for example by a light barrier, by ultrasound, by optical detection and image processing and the like. A conveying speed of a belt conveyor may be detected by detecting the speed of a pulley cooperating with the conveyor belt, be it a support pulley or a drive pulley, or by directly detecting the track speed of the conveyor belt. In vibrating conveyors, the vibration amplitude and vibration frequency may be a measure for the speed of material supported on a vibrating conveyor, so that a detection of the vibration amplitude and of the vibration frequency is a detection of values of variables representing the conveying speed. For all conveyor apparatuses, it is also the case that their conveying capacity is derivable from the drive power of a motor that drives them, so that the conveying capacity can be derived indirectly from the detection of a motor torque and of a motor speed. For some types of electric motors, the output motor torque may be ascertained from the motor current drawn. For hydraulic motors, the output torque is proportional to the product of the pressure drop across the hydraulic motor and its displacement. Apart from that, it is possible to ascertain and store a torque characteristic map for any motor as a function of its control variables. From the detected control variables, the control unit is then able to ascertain the motor torque by retrieving the torque characteristic map.

In the same way as a fill ratio of the material buffer and/or a fill ratio of a conveyor apparatus, it is possible to detect a fill ratio of a working unit. Here, sensors may be used, which for detecting the fill ratio make use of the same physical operating principles as the aforementioned sensor for ascertaining fill ratios. The working unit may be at least one crushing apparatus of the at least one crushing apparatus and/or may be a screening apparatus of the at least one screening apparatus. A fill ratio of a working unit of the rock processing device is an important factor influencing the material flow in the rock processing apparatus and thus for the discharge or depletion of the material buffer.

As the fill ratio of a conveyor apparatus is related to the conveying speed of the conveyor apparatus, so the fill ratio of a working unit is related to the operating speed of the working unit. Hence, in a preferred development of the present disclosure, an operating speed of a working unit, that is, of at least one crushing apparatus and/or at least one screening apparatus, may be detected.

In the case of a crushing apparatus, regardless of the concrete type of crusher, there is always an input shaft, which supplies kinetic energy to a movable part of the crushing apparatus, such as the movable crusher jaw of a jaw crusher, the rotor of an impact crusher, the cone of a cone crusher or the roll of a roll crusher. Here, the speed of the input shaft, possibly by additional detection and consideration of the torque supplied by the input shaft, may be a measure for the working speed of the crushing apparatus. The torque of the input shaft is the torque of a machine driving the input shaft, possibly converted by at least one gear situated between the driving machine and the input shaft.

Since the screening apparatus of a rock processing apparatus as a vibrating screening apparatus functions in a similar manner as a vibrating conveyor, the working speed of the screening apparatus may be represented by an amplitude and/or a frequency of a periodic screening movement. The screening apparatus is also driven to perform its periodic movement by a drive shaft. The speed of the drive shaft, possibly with the additional detection and consideration of the torque delivered by the drive shaft, is likewise an indicator of the working speed of a screening apparatus. Thus, a sensor for detecting the working speed of the screening apparatus is able to detect the motion amplitude and/or the motion frequency of the screening apparatus and/or a speed and/or a torque of the drive shaft of the respective screening apparatus.

A further possible detectable operating parameter is the grain shape and/or the grain size of fed and/or conveyed material and/or the proportion of foreign material in the fed and/or conveyed material, the conveyed material normally having previously been fed into the material feed apparatus. Additionally or alternatively, the distribution of grain sizes, that is, the frequency of the occurrence of individual varied grain sizes or grain size range, in the fed and/or conveyed material may be an operating parameter relevant for the material flow in the rock processing apparatus. Grain shapes and/or grain sizes and grain size distributions and/or the proportion of foreign material may be detected by image processing, for example. The grain size distribution is especially a determining factor influencing the result of pre-screening, which in turn influences the quality of a downstream crushing apparatus and consequently the amount of accruing oversize grain. Foreign material is in particular non-crushable material, such as plastic, wood, steel and the like. These foreign materials may interfere with the operational sequence of a rock processing apparatus.

The grain size and/or the grain size distribution and/or the proportion of foreign material of or in fed material is also a measure for the potential of loading the material buffer in a spatially uneven manner. During a material feed, larger grains normally distribute less uniformly than smaller grains, due to the impulse received when dumped into the material buffer. Foreign material, for example steel reinforcements from reinforced concrete may also hinder a uniform feed of material in the material buffer and/or in a downstream conveyor apparatus. Grain shapes and/or grain sizes and grain size distributions and/or the proportion of foreign material may be detected qualitatively and/or quantitatively.

What was said above about the fill ratio of the material buffer and its detection applies mutatis mutandis to a fill ratio of a possibly present further material buffer situated in the flow of material of the rock processing apparatus or of the rock processing system comprising it.

The oversize grain produced when crushing rock material is normally conveyed back into the material buffer via one and the same oversize grain conveyor apparatus into one and the same subarea of the overall feed area and thus contributes to the fill ratio of the material buffer and to its spatial and temporal depletion behavior. Thus, a detection of the quantity of returned oversize grain, in particular of oversize grain returned per unit of time, is also a meaningful operating parameter with respect to the spatial and temporal depletion behavior of the material buffer. The quantity of returned oversize grain may be detected optically and/or by image detection and image processing. Additionally or alternatively, the detection of a weight of oversize grain material conveyed per unit of time via a returning oversize grain conveyor belt is conceivable for detecting the quantity of returned oversize grain. Since the construction type of the rock processing apparatus and its components is known, data may be provided to the control unit, for example in the aforementioned data memory, from which the control unit is able to ascertain a local spatial influence of the returned oversize grain on the fill ratio or local area fill ratios from the quantity of returned oversize grain, in particular from the quantity of oversize grain returned per unit of time.

A very meaningful operating parameter is the type of material fed into the rock processing apparatus and conveyed by the latter. The type of material to be processed may be determined by one or multiple qualitative parameters and/or by one or multiple quantitative parameters. According to a classification defined in advance, a qualitative parameter may include for example "hard rock", "soft rock", "reinforced concrete", "asphalt", "demolition rubble", "gravel" and/or "railroad ballast". A quantitative parameter may comprise values determined according to recognized and preferably standardized measuring methods, for example, for density and/or hardness and/or crushability and/or abrasiveness and/or moisture of the fed or conveyed material. According to a classification defined in advance, these parameters may also have the qualitative contents "hard", "medium hard", "soft", "good crushability", "average crushability", "poor crushability", "little moisture", "average moisture", "high moisture", etc.

The density may be determined quantitatively for example from an optical volume measurement and simultaneous weighing, for example by a scale integrated in the conveyor apparatus. The moisture of the material may be ascertained by a corresponding moisture sensor. The abrasiveness may be determined by an LCPC test. The crushability of a material may be determined in parallel to the abrasiveness during the LCPC test or may be determined as a Los Angeles value in accordance with DIN EN 1097-2 in the respectively currently valid version.

Depending on its type, the material may exhibit or lead one to expect different spatial distribution behavior during the material feed, that is, when pouring it into the material buffer, so that the type of material may be a measure of to what degree material fed into the material buffer remains in the actual subarea of the material feed or to what degree, driven by the impulse received as it is poured, it moves from the actual subarea of the material feed into neighboring subareas. This also contributes to different local area fill ratios and thus also to different local depletion behavior.

If the composition of the fed rock is known, then the control unit in response to the input of the respective type of rock via the input device is able to read out corresponding material values such as hardness, density and crushability from a table stored in the aforementioned data memory. In principle, it is also possible, however, to irradiate the fed material with energy-rich electromagnetic radiation, for example X-ray radiation, and to detect the irradiation response of the material and to draw inferences about the composition of the material and its properties and material characteristic values from the detected irradiation response with the aid of stored data tables.

The state of the material may be classified for example as precrushed and non-precrushed, "precrushed" denoting prior crushing by a rock processing apparatus. Precrushed material may be oversize grain returned in the same rock processing apparatus. Additionally or alternatively, precrushed material may be transferred to the respective rock processing machine from another rock processing apparatus situated upstream in the flow of material. In the case of mixtures of precrushed and non-precrushed material, the state of the material may be indicated by a mixture ratio, in particular a mass-related mixture ratio, of precrushed and non-precrushed material. The state of the material may in principle be detected by image processing like the grain shape, for example. Additionally or alternatively, the state may be transmitted to the control unit via data transmission by conveying means conveying precrushed and/or non-precrushed material for processing by the respective rock processing apparatus. With the aid of conveying means scales, such as belt scales or bucket scales for example, the respective conveying means is able additionally to transmit quantity information about the material of the respective state.

A further influential operating parameter, which is situated outside of the rock processing apparatus, however, is the size of the loading tool of a loading apparatus discontinuously loading the material buffer. This is for example the volume of a bucket of a backhoe or of a wheel loader as a possible loading apparatus. In principle, this variable may be input via the aforementioned input device or may be transmitted by a respective transmitting device on the loading tool to a receiving device on the rock processing apparatus tuned to the transmitting device. Finally, a sensor on the rock processing apparatus, for example a laser scanner, may detect the size of the loading tool directly or at least a size range assignable to the loading tool. The size, for example the volume, of the loading tool may also be ascertained by detecting the fill ratio change in the material buffer prior to and after a material feed process. The size of the loading tool is a measure for the quantity of material that can be fed into the material buffer in one material feed. The control unit is thus able to predict a measure of the change of the fill ratio or local area fill ratios resulting from the next material feed. Additionally or alternatively, the actual feed quantity may be detected, which was fed or is to be fed into the material buffer.

All the aforementioned parameters influence the fill ratio and its spatial variations in the material buffer of the rock processing apparatus, in particular as operating parameters varying over time and thus the spatial, and in particular also temporal, depletion behavior, with which the material buffer is depleted by normal rock processing in the rock processing apparatus.

The detection of several of the aforementioned parameters with the inclusion of the fill ratio of the material buffer during the operation of the rock processing apparatus allows the control unit to detect the spatial change of the fill ratio of the material buffer, in particular as a function of time, in dependence on the other detected operating parameters including time, and by methods of artificial intelligence, such as deep learning for example, or other analytical methods, the control unit is able to learn an at least qualitative relationship of dependency between the fill ratio of the material buffer, in particular the local area fill ratios, and the other detected operating parameters and use this to predict in which subarea of the overall feed area a new material feed will be required. With increasing operating time, the predictive accuracy of the control unit by way of its location information thus becomes increasingly more precise.

Additionally or alternatively, a functional relationship or data relationship or multiple functional relationships or data relationships between the fill ratio of the material buffer, in particular of its local area fill ratios, and one or multiple additional aforementioned operating parameters may be determined in advance by experiment in test operations of the rock processing apparatus and stored in a suitable form in the data memory. Suitable forms are inter alia formulas, characteristic maps, fuzzy sets and the like.

The at least one functional relationship or data relationship ascertained in advance in test operations may be a basis for predicting a future development of the fill ratio of the material buffer, in particular its local area fill ratios, and thus for ascertaining the location information. It may also be, and this is preferred, the basis for continued learning with the aid of methods of artificial intelligence in the further operation of the rock processing apparatus.

The functional relationships of multiple rock processing devices thus learned or developed further by continued learning may be transmitted to a central data collection point, for example of the manufacturer of the apparatus or of the manufacturer's contract partner, and may be evaluated there and consolidated, for example. After a revision of this kind, the then improved functional relationships may be transmitted to new and/or existing rock processing apparatuses and used by these as the basis for ascertaining the location information as a function of the at least one operating parameter.

As was already explained above, at least one operating parameter or multiple operating parameters may also be supplied to the control unit via the input device, possibly by interposition of the data memory. The control unit is therefore preferably additionally designed to ascertain, in operation with discontinuous material feed, the location information by taking into consideration at least one of the following pieces of information input into the input device: setpoint fill ratio of the material buffer; in each case one local setpoint area fill ratio of at least two different areas of the material buffer; setpoint grain size and/or setpoint grain size distribution of fed and/or conveyed material; type of the rock processing apparatus; type of fed and/or conveyed material; type of the loading apparatus discontinuously loading the material buffer; size of a loading tool of the loading apparatus discontinuously loading the material buffer; feed quantity of material to be fed or already fed.

The designation as "setpoint" indicates that the respective parameter is not detected using sensors but is rather specified as a setpoint value. For this purpose, the control unit assumes that the rock processing apparatus and its components is operated with respective actual values, which differ from the specified setpoint values only within a predetermined tolerance range and otherwise agree with these to a sufficient degree. This makes it possible to limit the expenditure for the sensorial detection of operating parameters to a few highly relevant operating parameters, which include for example the fill ratio of the material buffer, without thereby suffering excessive loss of predictive accuracy in the location information.

Otherwise, what was said above about the sensorially detected operating parameters respectively applies to the use of the pieces of information input into the input device for ascertaining the location information.

In order to ascertain the location information as precisely as possible, the control unit may be designed to ascertain, in the operation with discontinuous material feed, the location information by taking into consideration pieces of information retrieved from a or the aforementioned memory device, for example a type of the rock processing apparatus.

The type of rock processing apparatus is to be understood in terms of aspects of its structural and/or functional design. Thus, for example, if a portion of the overall feed area is developed as a grate or screen in order to start a pre-screening process already as closely as possible to the material buffer, it may be desirable to perform material feeds in a target subarea of the overall feed area, which is at a distance from the grate or screen and from which material must first be conveyed to the grate or screen. The grate or screen may be part of a feed conveyor apparatus, in particular as a trough conveyor apparatus, by which material is conveyed away from the material buffer toward a working unit. A material feed in a target subarea at a distance from a location of pre-screening may be achieved in that by the conveyor movement of the material toward the location of pre-screening the material is intermixed, in particular with respect to different grain sizes, or that grains of different sizes move within the fed material, so that grains passing gaps of the grate or meshes of the screen, which initially lie on top of larger grains, are actually able to reach the grate or the screen so that they may be sorted.

Depending on the structural and functional design of a crushing apparatus situated in the rock processing apparatus, a respectively adapted varying material supply for charging the crushing apparatus may also be advantageous. The material supply respectively most advantageous for the existing crushing apparatus may already be supported in the material buffer by a corresponding suitable material feed.

In order to make the location information accessible to third parties, in particular machine operators of loading apparatuses, the output device may be designed to output information in a kind of undirected output independently of the receiver into a spatial region at least partially surrounding the rock processing apparatus and/or adjoining the rock processing apparatus. This preferably means that no receiving device is required in order to present the location information output by the output device in a form that is comprehensible for human beings or for electronic data processing devices.

Thus, the output device may output the location information in a visually perceptible manner, for example by displaying a projection or a marker, for example cross hairs and/or a light spot and/or a frame, into the overall feed area, in order to differentiate the target subarea of the future material feed from those subareas, in which a material feed is less desired or preferred. For this purpose, the rock processing apparatus, in particular the output device, may have a projection device, which indicates in a visually perceptible manner the target subarea within the overall feed area, for example in the aforementioned manner, for example by projecting a marker.

Alternatively or additionally, the rock processing apparatus may have a receiving device developed separately from a machine body of the rock processing apparatus, which is movable relative to the machine body and is separable or separated from the machine body, in order to ensure that the location information arrives directly where it is actually needed. The output device then outputs the location information by transmitting it to the receiving device. The receiving device itself is designed to output the received location information in a perceptible manner to an operator and/or to process and/or use it to control components of the machine.

For example, the receiving device may render a graphical representation of the overall feed area of the rock processing apparatus and mark the target subarea in this graphical representation, for example by at least one element of: a frame, cross hairs, a color spot and the like.

In principle, the receiving device may be permanently installed in another apparatus. This is preferably the loading apparatus, particularly preferably an operator's platform of the loading apparatus. In a preferred development, the receiving device is a portable receiving device such as a smartphone, a tablet computer or a laptop computer, for example. It may then be carried along by a machine operator of the loading apparatus and thus may present the location information to the machine operator even when the latter is not at his loading apparatus.

Due to the interaction between the rock processing apparatus and a loading apparatus required to ensure an operation of the rock processing apparatus at an advantageous operating point, the present disclosure also relates to a machine combination of a rock processing apparatus having a separate, separated or separable receiving device and having a loading apparatus loading the material buffer of the rock processing apparatus in discontinuous fashion. The receiving device is preferably situated in the loading apparatus in order to provide the location information where it is directly needed so as to be able to ensure that the material buffer is loaded in the locally most precise manner possible.

The loading apparatus may be a backhoe or a wheel loader, depending on the configuration of the job site, on which the rock processing apparatus or the machine combination is used. The term "job site" very generally includes any location of a production or provision of material to be processed by the rock processing apparatus, such as stone quarries, gravel pits, building demolition sites, recycling yards and the like. The term "mineral material" therefore includes both natural mineral material as well as mineral material produced by processing. The latter includes building materials as well as returned oversize grain.

The receiving device may output the location information graphically and/or acoustically to a machine operator of the loading apparatus, for example also via a head-up display, so that the machine operator upon taking note of the location information is able to perform the necessary actions to ensure a timely loading of the material buffer. Additionally or alternatively, the receiving device may be coupled in signal-transmitting fashion to a transport-relevant operating component of the loading apparatus and control this operating component according to the location information. A transport-relevant operating component may be for example at least one actuator on the loading apparatus, which moves a loading tool of the loading apparatus, such as a bucket of the backhoe or wheel loader, for filling the same.

Thus a partially automated operation assisting the machine operator of the loading apparatus or even a fully automated operation of the loading apparatus via the receiving device is possible, possibly supported by at least one further control unit on the side of the loading apparatus.

The at least one operating parameter may be detected qualitatively and/or quantitatively. If more than one operating parameter is detected, then a portion of the operating parameters may be detected qualitatively and another portion may be detected quantitatively. Furthermore, it is also conceivable that at least one operating parameter is detected both quantitatively as well as qualitatively.

The type of material to be processed may be determined by one or multiple qualitative parameters and/or by one or multiple quantitative parameters. According to a classification defined in advance, a qualitative parameter may include for example "hard rock", "soft rock", "reinforced concrete", "milled asphalt material", "asphalt clod", "demolition rubble", "gravel", "railroad ballast" and/or "other".

A quantitative parameter may comprise values determined according to recognized and preferably standardized measuring methods, for example, for density and/or hardness and/or crushability and/or abrasiveness and/or moisture of the fed or conveyed material. According to a classification defined in advance, these parameters may also be determined qualitatively, in particular only qualitatively. For example, parameters may have the qualitative contents "hard", "medium hard", "soft", "good crushability", "average crushability", "poor crushability", "little moisture", "average moisture", "high moisture", etc. The qualitative gradation may comprise more than three grades.

The density may be determined quantitatively for example from an optical volume measurement and simultaneous weighing, for example by a scale integrated in the conveyor apparatus. The moisture of the material may be ascertained by a corresponding moisture sensor. The abrasiveness may be determined by an LCPC test. The crushability of a material may be determined in parallel to the abrasiveness during the LCPC test or may be determined as a Los Angeles value in accordance with DIN EN 1097-2 in the respectively currently valid version.

The rock processing apparatus may be part of a rock processing system, which comprises multiple rock processing apparatuses. These multiple rock processing apparatuses preferably operate in linked fashion in the sense that a rock processing apparatus upstream in the flow of material feeds its final grain product or one of its final grain products to a material feeding apparatus of a downstream rock processing apparatus. Such a rock processing system is then also to be understood as a rock processing apparatus in the sense of the present application, which has a plurality of rock processing subapparatuses.

DETAILED DESCRIPTION

Figure 1:
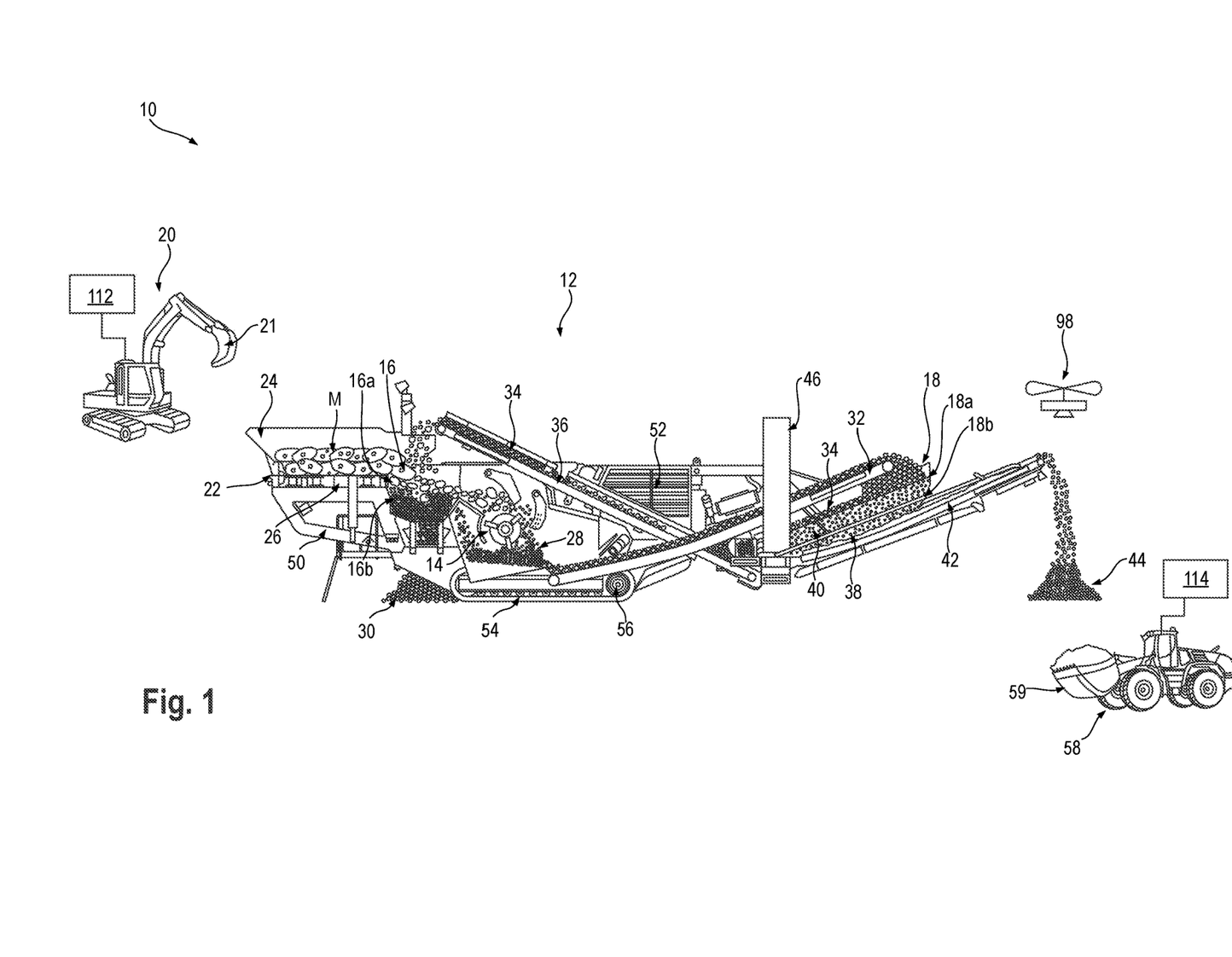
FIG. 1 shows a rough schematic view of a job site with a specific embodiment of a rock processing apparatus as disclosed herein.

A job site is generally denoted by 10 in FIG. 1. The central implement of the job site 10 is a rock processing apparatus 12 comprising an impact crusher 14 as a crushing apparatus and a pre-screen 16 as well as a post-screen 18 as screening apparatuses. The job site is in the present case preferably a rock quarry but may also be a recycling yard or a demolition site of one or multiple buildings.

Material M to be processed by the rock processing apparatus 12, that is, to be sorted according to size and to be crushed, is fed discontinuously by being loaded by a backhoe 20 as a loading apparatus of the rock processing apparatus 12 into a material feeding apparatus 22 having a funnel-shaped material buffer 24.

From the material feeding apparatus 22, a vibrating conveyor in the form of a trough conveyor 26 conveys the material M to the pre-screen 16, which comprises two pre-screen decks 16a and 16b, of which the upper pre-screen deck 16a has a greater mesh aperture and separates and feeds to the impact crusher 14 those grain sizes that require crushing according to the respective specifications for the final grain product to be obtained.

Grains falling through the upper pre-screen deck 16a are sorted further by the lower pre-screen deck 16b into a usable grain fraction 28, which corresponds to the specifications of the final grain product to be obtained and an undersize grain fraction 30, which has a grain size that is so small that it is unusable as value grain.

The number of stockpiles or fractions shown in the exemplary embodiment is provided merely by way of example. The number may be greater or smaller than indicated in the example. Moreover, the undersize grain fraction 30 explained in the present example as waste could also be a value grain fraction if the grain size range accruing in the fraction 30 is usable for further applications.

The usable grain fraction 28 is increased by the crushed material output by the impact crusher 14 and is conveyed to the post-screen 18 by a first conveyor apparatus 32 in the form of a belt conveyor. In the illustrated exemplary embodiment, the post-screen 18 also has two screen decks or post-screen decks 18a and 18b, of which the upper post-screen deck 18a has the greater mesh aperture. The upper post-screen deck 18a allows value grain to fall through its mesh and sorts out an oversize grain fraction 34 having a grain size that is greater than the greatest desired grain size of the value grain. The oversize grain fraction 34 is returned by an oversize grain conveyor apparatus 36 into the material input of the impact crusher 14 or into the pre-screen 16. In the illustrated exemplary embodiment, the oversize grain conveyor apparatus 36 takes the form of a belt conveyor.

The useful grain of the useful grain fraction 28 thus comprises oversize grain and value grain. In contrast to the illustration in the exemplary embodiment, the oversize grain conveyor apparatus 36 may also be swiveled outward from a machine frame 50 of the rock processing apparatus 12, so that the oversize grain fraction 34 is stockpiled instead of being returned.

The value grain that fell through the meshes of the upper post-screen deck 18a is fractionated further by the lower post-screen deck 18b into a fine grain fraction 38 having a smaller grain size and a medium grain fraction 40 having a greater grain size.

Via a fine grain discharge conveyor apparatus 42 in the form of a belt conveyor, the fine grain fraction 38 is heaped to build a fine grain stockpile 44.

Figure 2:
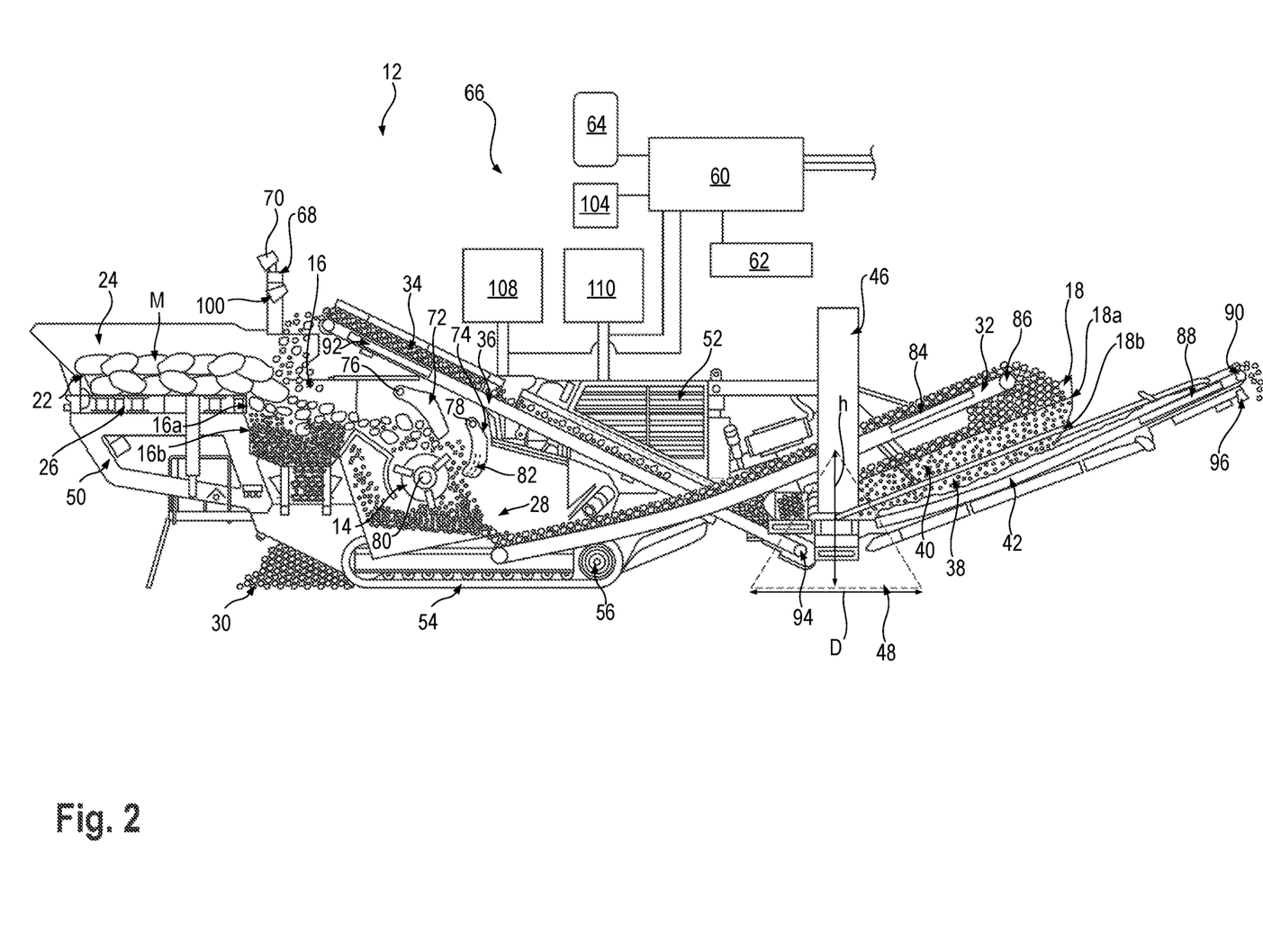
FIG. 2 shows the rock processing apparatus of FIG. 1 in an enlarged schematic lateral view.

Via a medium grain discharge conveyor apparatus 46, likewise in the form of a belt conveyor, the medium grain fraction 40 is heaped to build a medium grain stockpile 48 (not shown in FIG. 1 and shown only in rough schematic fashion in FIG. 2).

As a central structure, the rock processing apparatus 12 has a machine frame 50, on which the mentioned apparatus components are fastened or supported directly or indirectly. As central power source, the rock processing apparatus 12 has a diesel combustion engine 52 supported on the machine frame 50, which generates the entire energy consumed by the rock processing apparatus 12, unless it is stored in energy stores such as batteries, for example. Additionally, the rock processing apparatus 12 may be connected to job site electrical current, if provided on the job site.

In the illustrated example, the rock processing apparatus 12, which may be part of a rock processing system having a plurality of rock processing apparatuses situated in a common flow of material, is a mobile, more precisely a self-propelled, rock processing apparatus 12 having a crawler travel gear 54, which via hydraulic motors 56 as drive of the rock processing apparatus 12 allows for a self-propelled change of location without an external towing vehicle.

A reduction of the value grain stockpiles 44 and 48 and of the stockpile of the undersize grain fraction 30 occurs discontinuously by one or several wheel loaders 58 as an example of a removal apparatus. The stockpile of the undersize grain fraction 30 must also be reduced regularly in order to ensure an uninterrupted operation of the rock processing apparatus 12.

For an operational control that is as advantageous as possible, the rock processing apparatus 12 includes the apparatus components described below with reference to the larger illustration of FIG. 2:

The rock processing apparatus 12 comprises a control unit 60, for example in the form of an electronic data processing system with integrated circuits, which controls the operation of apparatus components. For this purpose, the control unit 60 may either control drives of apparatus components directly, for example, or may control actuators which in turn are able to move components.

The control unit 60 is connected to a data memory 62 in signal-transmitting fashion for exchanging data and is connected to an input device 64 for inputting information. Via the input device 64, for example a touchscreen, a tablet computer, a keyboard and the like, information may be input into the input device 64 and may be stored by the latter in the data memory 62.

The control unit 60 is furthermore connected in signal-transmitting fashion to an output device 66 in order to output information.

For obtaining information about its operating state, the rock processing apparatus 12 furthermore has diverse sensors, which are connected in signal-transmitting fashion to the control unit 60 and thus in the illustrated example indirectly to the data memory 62. For better clarity, the sensors are shown only in FIG. 2.

A camera 70 is situated on a supporting frame 68, which records images of the material feeding apparatus 22 with the material buffer 24 and transmits these to the control unit 60 for image processing. With the aid of camera 70 and by processing the images it records of the material buffer 24 and of the material feeding apparatus 22, the control unit ascertains a local fill ratio of the material buffer 24 by using data relationships stored in the data memory 22.

Furthermore, a vibration amplitude and vibration frequency of the drive (not shown) of the trough conveyor 26 are detected and transmitted to the control unit 60, which ascertains from this information a conveying speed of the trough conveyor 26 and ascertains a conveying capacity of the trough conveyor 26 toward the impact crusher 14 by considering the local fill ratio of the material buffer 24.

With the aid of predetermined data relationships, generated and/or developed by methods of artificial intelligence, the control unit 60 is able to detect from image information of camera 70 a grain size distribution in the material M in the material buffer 24 and even detect the type of material.

In impact crusher 14, an upper impact wing 72 and a lower impact wing 74 are situated in a manner known per se, the rotational position of the upper impact wing 72 being detected by a rotational position sensor 76 and the rotational position of the lower impact wing 74 being detected by a rotational position sensor 78 and being transmitted to the control unit 60. Via the rotational position sensors 76 and 78, the control unit 60 is also able to ascertain a crush gap width of an upper crush gap on the upper impact wing 72 and a crush gap width of a lower crush gap on the lower impact wing 74.

A speed sensor 80 ascertains the speed of the crushing rotor of the impact crusher 14 and transmits it to the control unit 60.

On components such as blow bars, impact wings, impact plates and impact bars, for example, which are particularly subject to wear, wear sensors may be provided which register wear progress, normally in wear stages, and transmit this to the control unit 60. In the illustrated example, for better clarity, a wear sensor system 82 is shown only on the lower impact wing 74.

In the first conveyor apparatus 32, a first belt scale 84 is situated, which detects the weight or the mass of the material of the useful grain fraction 28 transported across it on the first conveyor apparatus 32. Via a speed sensor 86 in a deflection pulley of the conveyor belt of the first conveyor apparatus 32, the control unit 60 is able to ascertain a conveying speed of the first conveyor apparatus 32 and in joint consideration with the detection signals of the first belt scale 84 is able to ascertain a conveying capacity of the first conveyor apparatus 32.

A second belt scale 88 is situated in the fine grain discharge conveyor apparatus 42 and detects the mass or the weight of the fine grain of the fine grain fraction 38 moved across it on the belt of the fine grain discharge conveyor apparatus 42. In the same way, via the speed sensor 90 in a deflection pulley of the conveyor belt of the fine grain discharge conveyor apparatus 42, a conveying speed of the fine grain discharge conveyor apparatus 42 and in joint consideration with the detection signals of the second belt scale 88, a conveying capacity of the fine grain discharge conveyor apparatus 42 can be ascertained by the control unit 60.

A third belt scale 92 is situated in the oversize grain conveyor apparatus 36 and ascertains the weight or the mass of the oversize grain of the oversize grain fraction 34 conveyed across it on the oversize grain conveyor apparatus 36. A speed sensor 94 of a deflection pulley of the conveyor belt of the oversize grain conveyor apparatus 36 ascertains the conveying speed of the oversize grain conveyor apparatus 36 and transmits it to the control unit 60, which in joint consideration with the detection signals of the third belt scale 92 is able to ascertain a conveying capacity of the oversize grain conveyor apparatus.

Figure 3:
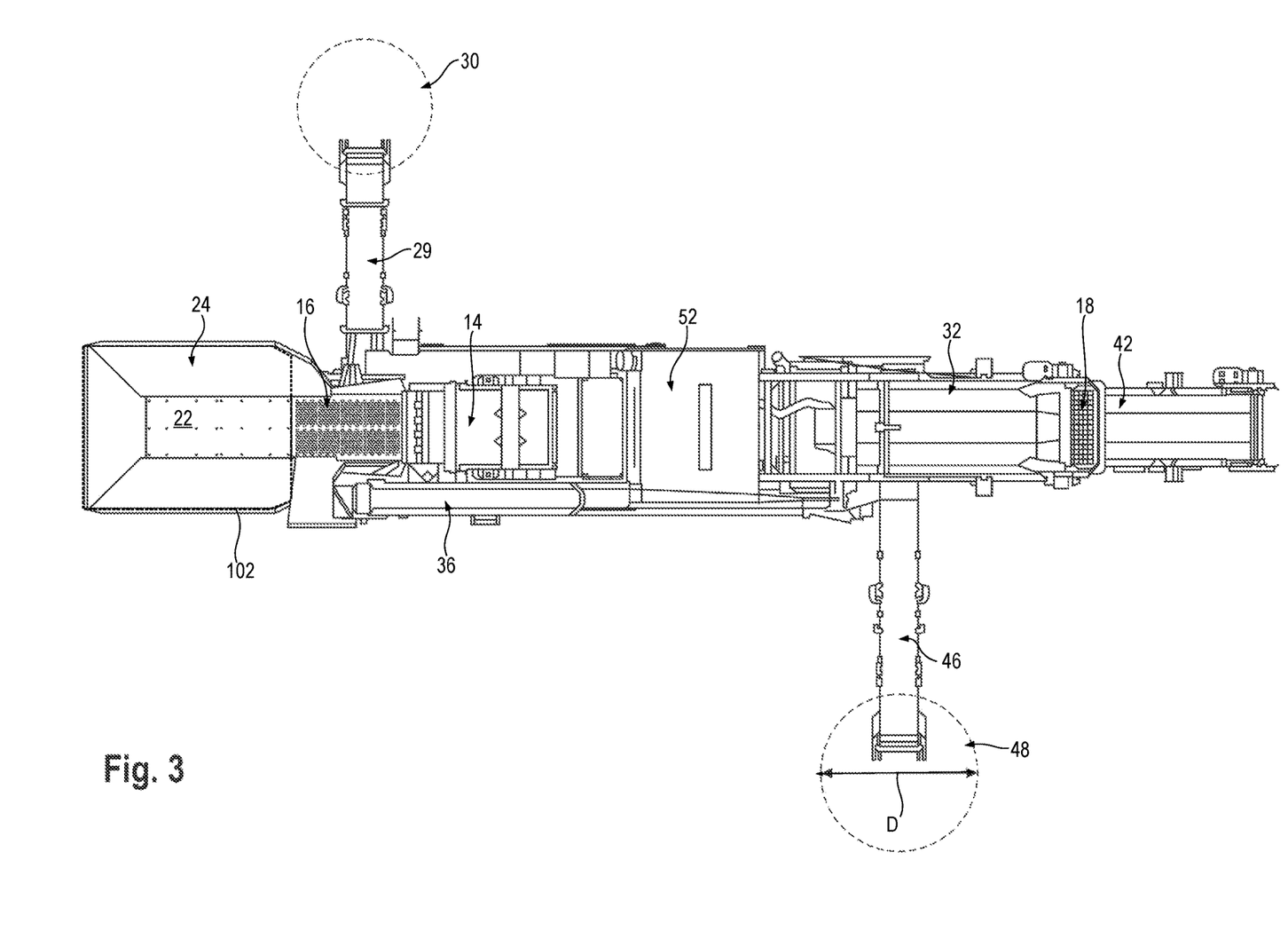
FIG. 3 shows the rock processing apparatus of FIG. 2 in an enlarged schematic top view.

At the discharge-side longitudinal end of the fine grain discharge conveyor apparatus 42, a first stockpile sensor 96 is situated, which as a camera records images of the fine grain stockpile 44 and transmits these as image information to a control unit 60, which detects contours of the fine grain stockpile 48 by image processing and on the basis of the known image data of the camera of the first stockpile sensor 96 starting from the detected contours ascertains a shape and from that a volume of the fine grain stockpile 48. For this purpose, to simplify its information ascertainment, the control unit 60 may assume an ideal conical shape of the fine grain stockpile 48 and ascertain the volume of an ideal cone approximating the real fine grain stockpile 48 without excessive error. Thus, it may suffice if a stockpile sensor ascertains the diameter D of the base area of a stockpile and the height h of the stockpile, as is shown in FIGS. 2 and 3 in the example of stockpile 48.

FIG. 1 shows a second stockpile sensor 98 that can be used alternatively or additionally. The second stockpile sensor 98 comprises a drone capable of flying as a carrier, which may be remote controlled in its movement by control unit 60. The second stockpile sensor 98 is also used to ascertain at least a height of the fine grain stockpile 48, preferably, however, to ascertain its shape and thus its volume. An advantage of using a drone or a sensor installed at an elevated location, for example on a high mast or post, is that one sensor is able to detect more than one stockpile with respect to its height and/or its shape and/or its volume. A number of sensors that is lower than the number of stockpiles to be detected at the rock processing apparatus 12, at a rock processing system or at the job site 10 may then suffice in order to detect every one of the stockpiles to be detected. Preferably, exactly one sensor will then suffice in order to detect all of the stockpiles to be detected.

Each discharge conveyor apparatus producing a stockpile preferably has at least one stockpile sensor or cooperates with a stockpile sensor.

The other discharge conveyor apparatuses, such as the medium grain discharge apparatus 46 and an undersize grain discharge apparatus 29, preferably also have belt scale and a speed sensor for detecting the quantity of material transported on the respective conveyor apparatus, the conveying speed and hence the conveying capacity.

The output device 66 may have a projection device 100, for example on the supporting frame 68, in order to project a marker within the overall feed area 102 shown in FIG. 2, which is identical with the feed opening of the material buffer 24. The overall feed area 102 is chosen is such a way that a grain falling along the direction of the force of gravity reaches the material feeding apparatus 22 without falling directly onto the pre-screen 16.

Figure 4:
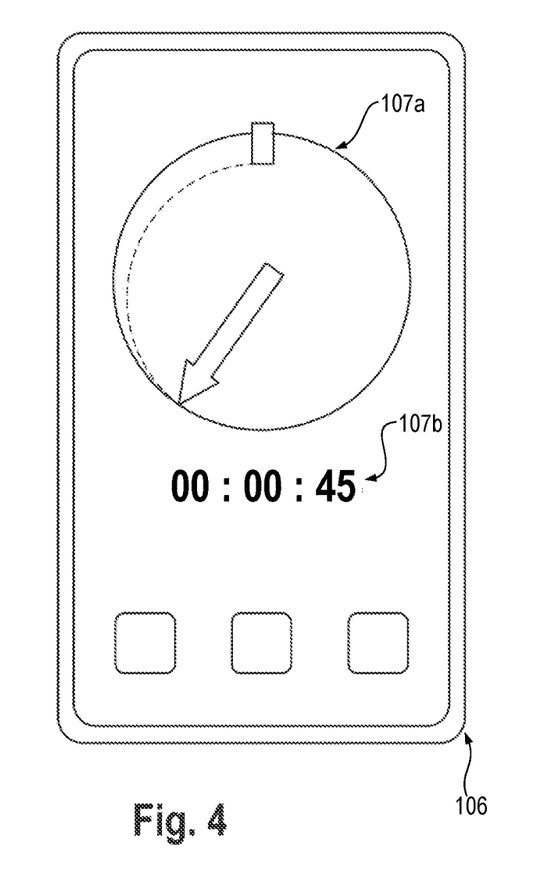
FIG. 4 shows a rough schematic view of a receiving device for outputting time information.
Figure 5:
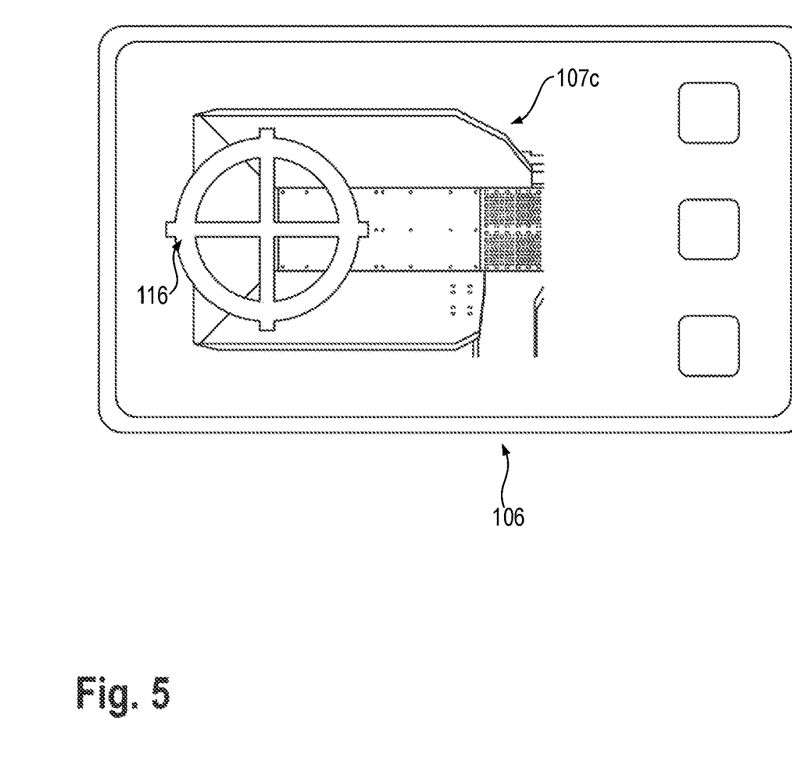
FIG. 5 shows a rough schematic view of a receiving device for outputting location information for a material feed to a material feeding apparatus of the rock processing apparatus.

The output device 66 further comprises a transmitting/receiving unit 104, which in wireless fashion and in a suitable data protocol is able to transmit data to and receive data from a receiving device set up for communication with it, for example the receiving device 106 in FIGS. 4 and 5.

The output device 66 further includes a first display device 108, for example in the form of a monitor, for the externally perceptible display of time information about a next material feed into the material feeding apparatus 22. In the illustrated specific embodiment, the output device 66 also includes a second display device 110, for example again a monitor, for the externally perceptible display of time information and location information about a next stockpile reduction. For this purpose, the display device 110 indicates not only time information as to when a next stockpile reduction should begin, but also location information as to which of the stockpiles should be reduced at the indicated time, and possibly also by what amount the indicated stockpile should be reduced.

The backhoe 20 further comprises a transmitting/receiving device 112 including a data memory, which is set up for communication with the transmitting/receiving unit 104 of the rock processing apparatus 12. The transmitting/receiving device 112 is thus able to transmit to the transmitting/receiving unit 104 relevant data about the backhoe 20, such as the holding capacity of its bucket 21 as its loading tool and/or its current GPS data.

The wheel loader 58 accordingly comprises a transmitting/receiving device 114 including a data memory, which is set up for communication with the transmitting/receiving unit 104 of the rock processing apparatus 12. The transmitting/receiving device 112 is thus able to transmit to the transmitting/receiving unit 104 relevant data about the wheel loader 58, such as the holding capacity of its bucket 59 as its removal tool and/or its current GPS data.

In the illustrated example, the data memory 62 contains multiple data relationships, which link operating parameters and/or material parameters with one another. These data relationships may be ascertained in advance by test operations with specific parameter variations and stored in the data memory 62. In particular for more complex multidimensional data relationships, the use of methods of artificial intelligence is helpful for ascertaining causal relationships between operating parameters and/or material parameters. In the further operation of the rock processing apparatus 12, the data relationships thus ascertained may be continuously verified, refined and/or corrected, again preferably using methods of artificial intelligence.

The discontinuous material feed naturally results in a surge-like material feed, a surge of fed material being limited by the size of the bucket 21 of the backhoe 20. The time intervals between two discontinuous material feeds are not predictable and will fluctuate.

To avoid interruptions in the operational sequence of the rock processing apparatus 12, the control unit 60 ascertains on the basis of detection signals of one or multiple of the previously mentioned sensors a piece of time information, which represents an execution time of a future, in particular next, material feed into the material feeding apparatus 22.

For this purpose, the control unit 60 preferably uses the ascertained locally differentiated fill ratio of the material buffer 24 and takes into consideration the conveying capacities of the trough conveyor 26 and for example of the undersize grain conveyor apparatus 29 as well as of the first conveyor apparatus 32. An analysis of the material streams of the trough conveyor 26 into the impact crusher 14 and of the undersize grain conveyor apparatus 29 and the first conveyor apparatus 32 away from the impact crusher 14 indicates whether the fill ratio of the impact crusher 14 changes over time, for example grows or diminishes, and thus indicates whether the conveying capacity of the trough conveyor 26 can be maintained or must be changed. The conveying capacity of the trough conveyor 26, however, determines how quickly the material buffer 24 is depleted and should be loaded again with material. Alternatively or additionally, a sensor may also be provided on the rock processing apparatus 12 for detecting the fill ratio of the impact crusher 14 directly.

The control unit 60 also considers the quantity of returned oversize grain, since the oversize grain fraction 34 also contributes to the fill ratio of the material buffer 24.

A predefined data relationship stored in the data memory 62 may link the detection signals of the camera 70, of the first belt scale 84, of the speed sensor 86, of a belt scale and a speed sensor on the undersize grain discharge conveyor apparatus, of the belt scale 92 and of the speed sensor 94 of the oversize grain conveyor apparatus 36 and of the size of the bucket 21 of the backhoe 20, possibly by taking the distance of the backhoe 20 from the material feeding apparatus 22 into consideration, as input variable with a piece of time information as the output variable, which indicates when a next material feed into the material feeding apparatus 22 is to take place. This time information on the one hand may be displayed on the first output device 108 in a suitable form, for example as an hourglass, waiting time bar, time countdown or analog clock representation, perceptible for anyone within visual range of the rock processing apparatus 20.

The time information may also be transmitted by the transmitting/receiving unit 104 to a mobile receiving device 106, which is available to the machine operator of the backhoe 20. The mobile receiving device 106 may be a portable mobile device, such as a mobile telephone, a tablet computer and the like, or may be permanently installed in the backhoe as part of its control unit and may remain in the backhoe 20.

FIG. 4 shows by way of example a representation of a piece of time information on the receiving device 106 both graphically in the upper half by indicator representation 107a as well as alphanumerically in the lower half by time countdown 107b. In the illustrated case, a next material feed is desired in 00 minutes and 45 seconds.

The control unit 60 is thus able successively to control the discontinuous material feed and able to ensure a good flow of material in the rock processing apparatus 12 in spite of the discontinuity of the material feed.

Due to the local or regional resolution of the fill ratio in the material feeding apparatus 22 or in material buffer 24, the control unit 60 on the basis of a further data relationship stored in the data memory 62 is also able to control the next material feed not only in terms of time, but also spatially within the overall feed area 102 of the material buffer 24 or material feeding apparatus 22 or to indicate a piece of location information about a preferred material feed location within the overall feed area 102.

For the specific construction type of the material feeding apparatus 22 and the rock processing apparatus 12 as a whole, which may be identified parametrically in the data memory 62 so as to be usable for the control unit 60, the control unit 60 is thus able to advance the loading of the material buffer 24 in the most advantageous manner possible over the entire operating time of the rock processing apparatus 12.

Local overfilling of the material buffer 24 may thus be avoided as well as a direct feed of material onto the pre-screen 16. Furthermore, in places where locally the fill ratio within the material buffer 24 has fallen sharply, material may be fed to ensure an advantageous material bed in the material feeding apparatus 22.

On the basis of a predetermined data relationship, the control unit 60 is thus able to output location information to the machine operator of the backhoe 20 indicating where a next material feed should be provided within the overall feed area 102.

Via the projection device 100, the output device 66 is able to output this location information in a manner that is visible for everyone in that the projection device 100 within the overall feed area 102 or within the material buffer 24 projects a marker at the location at which the next material feed should take place.

Additionally or alternatively, the location information, as previously already the time information for the next material feed, may be output via the receiving device 106 to the machine operator of the backhoe 20. FIG. 5 shows an exemplary embodiment for a location information output. The receiving device 106 displays a schematic rendering 197c of the material buffer 24 with the overall feed area 102 and marks therein by a suitable marker 116 the desired feed location within the overall feed area 102 for the next material feed. Additionally, a preferred discharge height or a discharge height range may be indicated quantitatively, for example in meters and/or centimeters, or qualitatively, for example by indicating qualitative discharge height parameters such as "low", "medium" and "high". Particularly when communicating the location information to a, possibly partially automatic, backhoe control, the additional height information may be readily implemented.

Using the first stockpile sensor 96 and/or the second stockpile sensor 98 at the respective discharge conveyor apparatuses 29, 42 and 46, the control unit 60 is able to detect a growth of the stockpiles 30, 44 and 48 produced by the rock processing apparatus 12 by considering material parameters such as the type of the fed material, the grain size and grain size distribution and the bulk density possibly resulting therefrom, and is able above all to detect a rate of change or growth rate of the respective stockpile and, by using a previously produced and stored data relationship, to ascertain a piece of reduction time information indicating when a particular stockpile should be reduced by the wheel loader 58. This makes it possible to prevent the stockpile from growing excessively and from blocking a discharge via the discharge conveyor apparatus producing the respective stockpile.

Furthermore, by taking into consideration material parameters, such as the grain size and grain size distribution as well as the density, the control apparatus, by using a data relationship ascertained for this purpose, is able to ascertain a further piece of reduction information, which indicates to what extent a reduction is to take place.

If the rock processing apparatus 12, as in the present case, produces multiple stockpiles, then the output device 66 additionally outputs a further piece of reduction information, which identifies the stockpile to which the reduction time information pertains.

The control unit 60 is able to display the reduction time information and the further pieces of reduction information on the second display device 110 so as to be perceptible to anyone within the visual range of the rock processing apparatus 12. Additionally or alternatively, the output device 66 may transmit, via the transmitting/receiving unit 104, the pieces of information about the next stockpile reduction to the receiving device 106, where it is output to the machine operator of the wheel loader 58 in graphical and/or alphanumerical fashion.

Finally, from detection signals of suitable sensors, the control unit 60 is able to control operating parameters of the rock processing apparatus 12 in such a way that a predetermined desired ratio of fine grain quantity and medium grain quantity is obtained in the illustrated exemplary embodiment. In the same way, on the basis of appropriately prepared data relationships, the control unit 60 is able to control the rock processing apparatus 12 in such a way that its energy consumption per unit of quantity of processed mineral material reaches or is reduced to at least a local minimum. Additionally or alternatively, by using appropriately prepared data relationships, the control unit 60 is able to control the rock processing apparatus 12 in such a way that a quantity of oversize grain advantageous for the respective crushing process is returned so that a sufficient amount of support grain is present in the crush gap or in the crush gaps in the form of pre-crushed oversize grain. Indeed, an operation with the aim of minimizing or eliminating the amount of oversize grain is not necessarily the most economical operation of the rock processing apparatus 12 due to the advantageous effects of oversize grain as support grain in the crush gap. Frequently, a very small amount of oversize grain implies an excessively large amount of material that is crushed too finely, which is normally not desired. If the amount of returned material decreases, the quality of the final product often decreases along with it, since the final product then contains less repeatedly crushed material.

On the basis of the available data relationships ascertained in advance by test operations with specific parameter variation, the control unit 60 may also aim for an operation of the rock processing apparatus 12 on the basis of multiple target variables or one target variable with further specified boundary conditions, such as for example the production of value grain having different grain sizes in a predetermined quantitative proportion at lowest possible energy consumption and at the most advantageous amount of returned oversize grain.

For setting the operation of the rock processing apparatus 12 in accordance with the output variables of the at least one utilized data relationship, the control unit 60 may change the conveying speed of one or multiple conveyor apparatuses, may change the crush gap width, in particular of the upper and/or of the lower crush gap, may change the rotor speed, may control the material feed into the material feeding apparatus 22 spatially and temporally, etc.

The input variables used for optimizing the operation may be the size and/or the height and/or the growth of value grain stockpiles, presently for example the value grain stockpiles 44 and 48, the size and/or the height and/or the growth of the stockpile of the undersize grain fraction 30, the quantity of returned oversize grain, the fed grain size and fed grain size distribution, which are primarily ascertainable via the material parameters input via the input device 64. The input material parameters may comprise at least one material parameter of: the type of material, degree of humidity, hardness, density, crushability, abrasiveness, proportion of foreign substances in the fed and/or processed material, etc., the grain size and grain size distribution in the individual discharge conveyor apparatuses. The enumeration is not conclusive. In the discharge conveyor apparatuses, the grain size and grain size distribution, possibly also the grain shape, may be ascertained by cameras with subsequent image processing. The grain size and the grain size distribution in a discharge conveyor apparatus may be ascertained additionally or alternatively by the occupancy of a screening device upstream of the respective discharge conveyor apparatus in the flow of material. Additionally or alternatively, the desired setpoint quantity of a respective final product may be used as input variable for optimizing the operation.

By application of methods of artificial intelligence, the control unit 60, if desired with the involvement of powerful external data processing devices, is able continuously to improve the targeted precision of the stored data relationships by its daily operation and the data and findings gathered in the process.

The rock processing apparatus 12 itself is thus not only able to improve its own operation but is basically able successively to take over the organization of the entire job site in the vicinity of the rock processing apparatus 12.

What is claimed is:

1. A rock processing apparatus for crushing and/or for sorting granular mineral material according to size, the rock processing apparatus comprising:
   a material feeding apparatus including a material buffer configured to be loaded with starting material to be processed, the material feeding apparatus having an overall feed area, through which a test specimen represented by its center of gravity falls freely and unhindered to reach the material buffer;
   at least one working unit comprising at least one crushing apparatus and/or at least one screening apparatus;
   at least one conveyor apparatus configured to convey material between apparatus components;
   at least one sensor configured to detect at least one operating parameter, and to transmit a detection signal representing the at least one detected operating parameter;
   a control unit connected to the at least one sensor and configured
      in an operation with discontinuous material feed of starting material to be processed, to ascertain a local target subarea within the overall feed area, selected for the next material feed, based on the at least one detection signal as location information, and
      to control apparatus components of the rock processing apparatus; and
   at least one output device connected to the control unit and configured to transmit output information comprising the location information received therefrom.

2. The rock processing apparatus of claim 1, comprising an input device configured to input information, and connected in signal-transmitting fashion to the control unit, the control unit configured in the operation with discontinuous material feed to ascertain the location information based on the at least one detection signal and a piece of information input into the input device.

3. The rock processing apparatus of claim 1, wherein the at least one sensor is configured to detect, and transmit signals representing, at least one operating parameters from the group consisting of: a fill ratio of the material buffer; in each case one local area fill ratio of at least two different areas of the material buffer; a fill ratio of at least one conveyor apparatus; a fill ratio of at least one working unit; a grain shape and/or grain size and/or grain size distribution of fed and/or conveyed material; a type of fed and/or conveyed material; a humidity of the fed material; a density of the fed material; a hardness of the fed material; a crushability of the fed material; an abrasiveness of the fed material; a state of the fed material; a quantity of returned oversize grain; a size of a loading tool of a loading apparatus discontinuously loading the material buffer; a feed quantity of material to be fed or already fed; a conveying speed of at least one conveyor apparatus; a working speed of at least one working unit; a quantity of material already processed by the rock processing apparatus, but returned into the material buffer; a quantity or proportion of, in particular non-crushable, foreign material.

4. The rock processing apparatus of claim 2, wherein the control unit is configured to ascertain, in the operation with discontinuous material feed, the location information by taking into consideration at least one piece of information input into the input device and selected from the group consisting of: setpoint fill ratio of the material buffer; in each case one local setpoint area fill ratio of at least two different areas of the material buffer; setpoint grain size and/or setpoint grain size distribution of fed and/or conveyed material; type of the rock processing apparatus; type of fed and/or conveyed material; type of the loading apparatus discontinuously loading the material buffer; size of a loading tool of the loading apparatus discontinuously loading the material buffer; and feed quantity of material to be fed or already fed.

5. The rock processing apparatus of claim 1, wherein the control unit is configured to ascertain, in the operation with discontinuous material feed, the location information by taking into consideration at least one piece of information retrieved from a memory device and comprising a type of the rock processing apparatus.

6. The rock processing apparatus of claim 1, wherein the output device is configured to output information independently of a receiver in a spatial area surrounding the rock processing apparatus at least partially and/or adjoining the rock processing apparatus.

7. The rock processing apparatus of claim 6, wherein the output device comprises a projection device configured to indicate in a visually perceptible manner the target subarea within the overall feed area.

8. The rock processing apparatus of claim 1, comprising a receiving device developed separately of a machine body of the rock processing apparatus and movable relative to the machine body and separable or separated from the machine body, wherein the output device is configured to transmit the location information to the receiving device.

9. The rock processing apparatus of claim 8, wherein the receiving device is a portable receiving device.

10. A machine combination comprising:
a rock processing apparatus comprising
   a material feeding apparatus including a material buffer configured to be loaded with starting material to be processed, the material feeding apparatus having an overall feed area, through which a test specimen represented by its center of gravity falls freely and unhindered to reach the material buffer,
   at least one working unit comprising at least one crushing apparatus and/or at least one screening apparatus,
   at least one conveyor apparatus configured to convey material between apparatus components,
   at least one sensor configured to detect at least one operating parameter, and to transmit a detection signal representing the at least one detected operating parameter,
   a control unit connected to the at least one sensor and configured
      in an operation with discontinuous material feed of starting material to be processed, to ascertain a local target subarea within the overall feed area, selected for the next material feed, based on the at least one detection signal as location information, and
      to control apparatus components of the rock processing apparatus,
   at least one output device connected to the control unit and configured to transmit output information comprising the location information received therefrom; and
a loading apparatus configured to discontinuously load the material buffer of the rock processing apparatus, and comprising a receiving device situated therein,
wherein the output device is configured to transmit output information comprising the location information to the receiving device.

11. The machine combination of claim 10, wherein the receiving device is configured to output the location information graphically and/or acoustically to a display device of the loading apparatus.

12. The machine combination of claim 10, wherein the receiving device is configured to control a transport-relevant operating component of the loading apparatus, based at least in part on the location information.

13. The machine combination of claim 10, comprising an input device configured to input information, and connected in signal-transmitting fashion to the control unit, the control unit configured in the operation with discontinuous material feed to ascertain the location information based on the at least one detection signal and a piece of information input into the input device.

14. The machine combination of claim 10, wherein the at least one sensor is configured to detect, and transmit signals representing, at least one operating parameters from the group consisting of: a fill ratio of the material buffer; in each case one local area fill ratio of at least two different areas of the material buffer; a fill ratio of at least one conveyor apparatus; a fill ratio of at least one working unit; a grain shape and/or grain size and/or grain size distribution of fed and/or conveyed material; a type of fed and/or conveyed material; a humidity of the fed material; a density of the fed material; a hardness of the fed material; a crushability of the fed material; an abrasiveness of the fed material; a state of the fed material; a quantity of returned oversize grain; a size of a loading tool of a loading apparatus discontinuously loading the material buffer; a feed quantity of material to be fed or already fed; a conveying speed of at least one conveyor apparatus; a working speed of at least one working unit; a quantity of material already processed by the rock processing apparatus, but returned into the material buffer; a quantity or proportion of, in particular non-crushable, foreign material.

15. The machine combination of claim 10, wherein the control unit is configured to ascertain, in the operation with discontinuous material feed, the location information by taking into consideration at least one piece of information input into the input device and selected from the group consisting of: setpoint fill ratio of the material buffer; in each case one local setpoint area fill ratio of at least two different areas of the material buffer; setpoint grain size and/or setpoint grain size distribution of fed and/or conveyed material; type of the rock processing apparatus; type of fed and/or conveyed material; type of the loading apparatus discontinuously loading the material buffer; size of a loading tool of the loading apparatus discontinuously loading the material buffer; and feed quantity of material to be fed or already fed.

16. The machine combination of claim 10, wherein the control unit is configured to ascertain, in the operation with discontinuous material feed, the location information by taking into consideration at least one piece of information retrieved from a memory device and comprising a type of the rock processing apparatus.

17. The machine combination of claim 10, wherein the output device is configured to output information independently of a receiver in a spatial area surrounding the rock processing apparatus at least partially and/or adjoining the rock processing apparatus.

18. The machine combination of claim 10, wherein the output device comprises a projection device configured to indicate in a visually perceptible manner the target subarea within the overall feed area.

* * * * *